(12) United States Patent
Oberoi et al.

(10) Patent No.: US 11,755,636 B2
(45) Date of Patent: Sep. 12, 2023

(54) SYSTEM AND METHOD FOR TEXT PROCESSING FOR SUMMARIZATION AND OPTIMIZATION

(71) Applicant: Axios HQ Inc., Arlington, VA (US)

(72) Inventors: Priyanka Oberoi, Silver Spring, MD (US); Sean P. Wojcik, Ann Arbor, MI (US); Grism L. Bolks, Washington, DC (US); Temitope Akinsipe, Lafayette, CO (US); Kaya Mana Baber, San Francisco, CA (US); Poornima Devi Kannan, Austin, TX (US); Nicholas Bisby, Milan, IL (US); Charlotte de Wolfe, Brooklyn, NY (US); Roilan Salinas-Ortiz, Clermont, FL (US)

(73) Assignee: AXIOS HQ INC., Arlington, VA (US)

( * ) Notice: Subject to any disclaimer, the term of this patent is extended or adjusted under 35 U.S.C. 154(b) by 0 days.

(21) Appl. No.: 17/169,774

(22) Filed: Feb. 8, 2021

(65) Prior Publication Data

US 2022/0253472 A1 Aug. 11, 2022

(51) Int. Cl.
*G06F 16/00* (2019.01)
*G06F 16/34* (2019.01)
*G06F 40/166* (2020.01)
*G06F 40/205* (2020.01)
*G06F 9/54* (2006.01)
*G06N 3/04* (2023.01)
*G06N 5/04* (2023.01)
*G06F 16/31* (2019.01)

(52) U.S. Cl.
CPC ............ *G06F 16/345* (2019.01); *G06F 9/547* (2013.01); *G06F 16/31* (2019.01); *G06F 40/166* (2020.01); *G06F 40/205* (2020.01); *G06N 3/04* (2013.01); *G06N 5/04* (2013.01)

(58) Field of Classification Search
CPC ........ G06F 16/345; G06F 9/547; G06F 16/31; G06F 40/166; G06F 40/205; G06N 3/04; G06N 5/04
See application file for complete search history.

(56) References Cited

U.S. PATENT DOCUMENTS

| 10,943,072 B1 * | 3/2021 | Jaganmohan .......... G06N 5/041 |
| 2015/0100887 A1 | 4/2015 | Verkasalo |
| 2015/0127325 A1 | 5/2015 | Birnbaum et al. |

(Continued)

OTHER PUBLICATIONS

International Search Report and Written Opinion in PCT Application No. PCT/US22/11951, dated Apr. 11, 2022. 16 pages.

*Primary Examiner* — Paul Kim
(74) *Attorney, Agent, or Firm* — Leason Ellis LLP

(57) ABSTRACT

A system for optimization of a block of text in accordance with a specific writing style, the system comprising a client application that implements functionality to process one or more blocks of text and a text processing system. The text processing system comprises an API and plurality of system components. The API receives requests from the client application as one or more blocks of text for optimization in accordance with a specific writing style or system. A given system component is operative to receive a given one of the one or more blocks of text from the API to return a recommendation to the client application that optimizes conformance of the given block of text in accordance with the specific writing style or system.

17 Claims, 9 Drawing Sheets

(56) References Cited

U.S. PATENT DOCUMENTS

| | | | |
|---|---|---|---|
| 2016/0085743 A1* | 3/2016 | Haley | G06F 40/40 |
| | | | 704/9 |
| 2016/0103841 A1 | 4/2016 | Zupancic | |
| 2019/0236210 A1 | 8/2019 | Makaremi et al. | |
| 2020/0293920 A1 | 9/2020 | Chung et al. | |
| 2020/0301672 A1 | 9/2020 | Li et al. | |
| 2020/0327189 A1 | 10/2020 | Li et al. | |
| 2020/0342164 A1* | 10/2020 | Satterfield | G06F 40/216 |
| 2021/0264109 A1* | 8/2021 | Srinivasan | G06F 40/166 |
| 2021/0295822 A1* | 9/2021 | Tomkins | G06F 9/547 |

* cited by examiner

SYSTEM AND METHOD FOR TEXT PROCESSING FOR SUMMARIZATION AND OPTIMIZATION

FIELD OF THE INVENTION

Embodiments of the invention are directed to text processing systems and methods and more particularly to text processing systems and methods that optimize one or more blocks of input text so as to conform with a writing style or system under consideration.

BACKGROUND OF THE INVENTION

Many writing styles and systems have been developed across a large number of disparate disciplines that are inherently tailored to their specific audiences, as well as general styles and systems that generally optimize the manner in which ideas are conveyed through specific blocks of text. For example, unique journalistic styles have been developed to optimize the writing of news content that are designed to be as reader-friendly as possible. Research indicates that such optimization improves text so as to be trustworthy, unbiased, and expert-written, but also brief and more readily digestible. The overarching goal of all such writing styles and systems is to improve communication efficiencies and to help readers expedite the digestion and integration of new information.

One such exemplary writing system is the SMART BREVITY® writing system developed by AXIOS® MEDIA INC. and is characterized by several main features: axioms, strategic bolding, strategic bullets, and brevity. Axioms, as that term is used herein, refer to short phrases and headings that organize one or more blocks of content into efficient, digestible chunks of information, which may comprise conveying some indication to the user of the relevance of the content associated with a given axiom. Exemplary axioms include, but are not limited to, phrases such as "1 BIG THING®", "1 FUN THING®", "why it matters", "the big picture", "the bottom line", "by the numbers", "yes, but", and "go deeper", each of which, again, provides a signal to the reader as to the relevance or significance of the text or the content associated with a given axiom. Strategic bolding may be used to draw the attention of the reader to axioms and other key phrases, which may comprise the application of such formatting to text at the beginning of a block of text. Strategic bullets may be used to break a larger block of text into a plurality of shorter pieces, which serves to make complex information easier to skim and otherwise integrate.

Despite the apparent simplicity of many writing styles and systems, such as the three basic components comprising the SMART BREVITY® style, they are not easily replicated by non-experts who are readily fluent with both written and unwritten components comprising a given style or system. For example, the effective use of axioms, strategic bolding, and strategic bullets is complex and depends on understanding subtle, nuanced features of a given set of text that are both objectively identifiable (e.g., text position, content, context) and subjective (e.g., how to choose between particular axioms). Although the nuances of any given writing style or system can be taught at seminars to companies, non-profits, university programs, etc., and there are a number of tools available that use guided feedback to improve the quality of user writing according to generally grammatical rules and practice, there is currently no software solution that uses aspects of artificial intelligence and machine learning to facilitate effective writing in accordance with a specific writing style or system.

Under the general umbrella of tools that aim to improve the quality of user writing with guided feedback, there are several groups of tools that offer related, but distinct, functionality to improve user writing. Specific examples of such tools are those that provide spelling and grammar checks. Spelling and grammar checks, which are typically integrated directly into other software, including word processors, email clients, and web browsers, provide real-time feedback to users as they type by highlighting, underlining, or otherwise calling out spelling and grammar errors. These tools typically provide replacement recommendations that can be implemented automatically upon acceptance by the user.

Another group of related tools falls into the category of tone and sentiment analyzers. Tone and sentiment analyzers are tools that use supervised machine learning algorithms to categorize and/or score the tone of text in accordance with various dimensions, such as positivity/negativity, formality/informality, confidence/tentativeness, etc. These tools may provide ratings or scores to the user and occasionally highlight particular clauses within the text contributing to higher or lower scores. For example, online editor tool of Microsoft Word® provides AI-based guidance with respect to spelling and grammar, complex sentences, biased language, reading time, unknown company acronyms, and styling (like tables). This guidance, however, is more broad-based and is not tailored to assist a writer following or adhering to a specific writing style or system.

Although there currently exist categories of tools that aim to generally improve the quality and clarity of user writing, tools that are known to those of skill are unable to guide users as to writing in accordance with specific writing styles and systems. Accordingly, there is a need in the art for systems, methods and computer program products that are operative to provide guidance to a user as to writing in accordance with a specific writing styles or systems, such as effectively using axioms, strategic bolding, and strategic bullets as developed in accordance with the SMART BREVITY® writing style.

SUMMARY OF THE INVENTION

Embodiments of the present invention are generally directed towards systems, methods and computer program products that use aspects of artificial intelligence and machine learning to optimize blocks of text so as to be drafted in accordance with a specific writing style or system. The facilitation of machine learning involves training one or more models with a corpus of training text that is specifically written in accordance with the writing style or system under consideration, which may comprise a corpus of text that is expertly written and edited in accordance with the writing style or system under consideration. Training one or more models in this manner serves to codify specific, expert-informed heuristics that may be incorporated into recommendations that a given model provides.

Functionality that embodiments of the present invention provide is distinct from those presently available in the art. For example, unlike tone detection application such as those discussed above, embodiments of the present invention are not directed towards the evaluation of particular emotions, sentiments, or emotive states, but rather are tailored make specific recommendations to improve style, format, and structure with respect to a given block of text. Similarly, unlike the class of applications that include spelling and grammar check applications, guidance provided by embodiments of the present invention do not indicate "correctness" of text, per se, but rather guide a user to write in accordance with a specific writing style.

Specific embodiments of the present invention are directed towards a system for optimization of text in accordance with a specific writing style, the system comprising a client application that implements functionality to draft and edit text and a text processing system. The text processing system comprises an API to receive requests from the client application as one or more blocks of text for optimization in accordance with a specific writing style or system. The text processing system further comprises a plurality of system components, a given system component of the plurality of system components operative to receive a given one of the one or more blocks of text from the API and return a recommendation to the client application that optimizes conformance of the given block of text in accordance with the specific writing style or system. The API may further route a given one of the one or more blocks of text that it receives from the client application to a specific one of the plurality of system components.

Embodiments of the system further comprise an interaction data processing pipeline for processing data regarding user interaction with the client application prior to such data being made available for querying and visualization by a monitoring system. According to one embodiment, the interaction data processing pipeline comprises an event stream service to route data as a series of data points that originate from the client application as the client application creates the interaction data and a data connector to create data objects on the basis interaction data from the event stream. The data connector provides a data export mechanism that guarantees exactly-once delivery semantics to consumers of the data objects that the data connector creates. A data lake may be provided as part of the interaction data processing pipeline to receive the data objects from the data connector for storage as a set of unstructured data.

The monitoring system may comprise one or more dashboards that query data from the interaction data processing pipeline regarding user interaction with the client application. For example, a given one of the one or more dashboards may provide pre-defined metrics and visualizations to assess user engagement. Similarly, a given one of the one or more dashboards provide pre-defined metrics and visualizations to assess model performance. The monitoring system may visualize for presentation other metrics collected and provided to the interaction data processing pipeline.

In accordance with embodiments of the system described above, a given one of the plurality of system components processes text data in accordance with a plurality of processing components. A given one of the plurality of processing components may comprise a parse component operative to parse the given one of the one or more blocks of text into parsed text and relevant metadata. Another component may comprise a preprocess component operative to perform one or more transformations on the given one of the one or more blocks of text. Still further, a system component may comprise a model inference component that provides a recommendation to optimize conformance of a given one of the one or more blocks of text with the specific writing style or system. The model inference component may comprise a neural network based model. Alternatively, or in conjunction with the foregoing, the model inference component may comprise a rules-based model. Finally, a given one of the plurality of processing components may comprise a post-processing component operative to apply one or more constraints to the recommendation prior to transmission to the client application.

BRIEF DESCRIPTION OF THE DRAWINGS

The invention is Illustrated in the figures of the accompanying drawing which are meant to be exemplary and not limiting, in which like references are intended to refer to like or corresponding parts, and in which.

DETAILED DESCRIPTION OF EMBODIMENTS OF THE INVENTION

Figure 1:
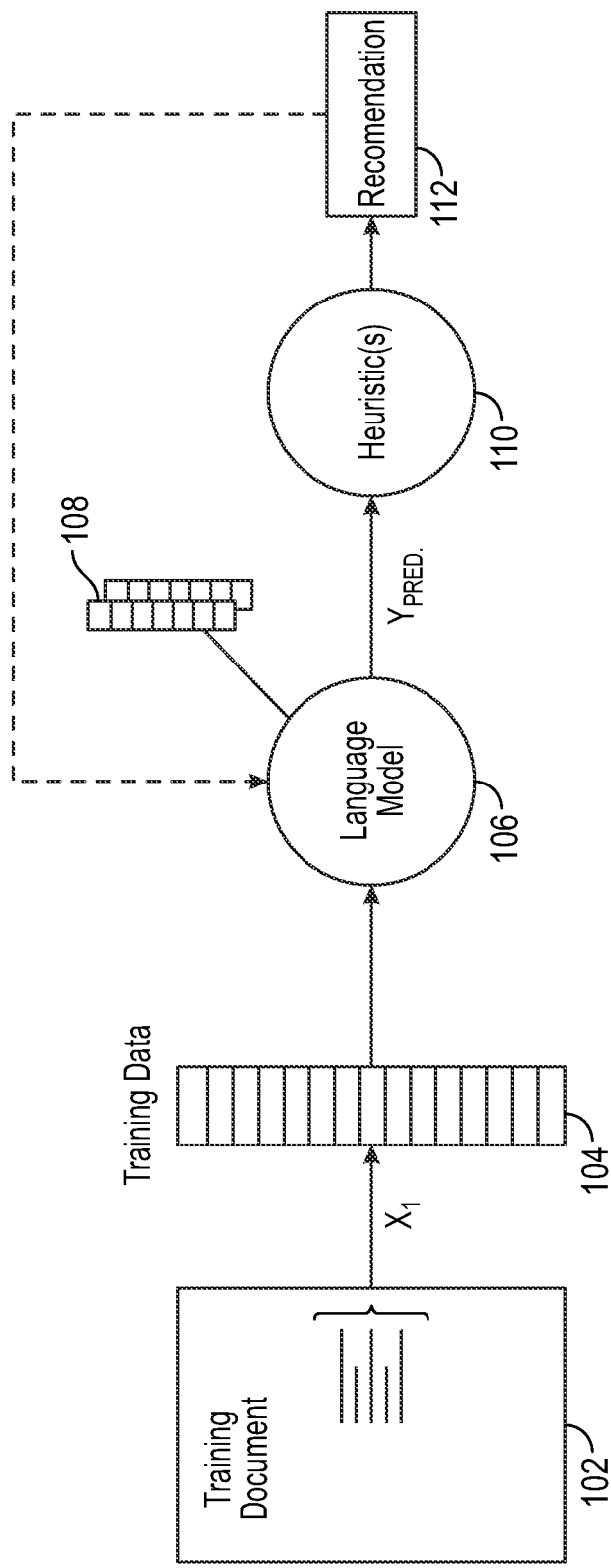
FIG. 1 presents a block diagram &strafing the overall flow for processing one or more blocks of text according to one embodiment of the present invention.

Embodiments of the present invention are directed towards systems, methods, and computer program products that provide guidance in helping a user draft text in accordance with a specific writing style or system. FIG. 1 presents a block diagram illustrating the overall flow of training a system for processing one or more blocks of text in accordance with one embodiment of the present invention. A user interacts with an editor application 102 to prepare one or more blocks of text that are known or otherwise expected to conform to a given writing style or system, which text may be written by an expert in the given writing style or system. As is explained herein in greater detail, when running analysis on one or more blocks of text written by a user that are not known or expected to conform to a given writing style or system, the optimization functionality provided by embodiments of the present invention extracts portions of text from a block of text and provides recommendations regarding changes in conformity with the writing style or system under consideration.

A given block of text 102 is concatenated with one or more engineered features and passed to a language model 106 as a set of training data 104, which may use a loss function to learn to accurately classify input. The block of text is passed to the language model 106 to produce one or more learned embeddings 108. These embeddings 108 are passed to the classification layers in the language model 106, one or more of which, according to one embodiment, implement a softmax output function. The classification layers in the language model 106 may provide a generalization of the logistic function to multiple dimensions, as well as provide a prediction (y prediction) indicating the highest probability that a portion or block of text conforms to a specific rule of a specific writing style or system under consideration. Further processing of such prediction is accomplished in conjunction with heuristic considerations 110 to produce a final prediction 112. The final recommendation 112 is evaluated to determine the degree to which the block of text conforms to the writing style or system under consideration, which may comprise presentation to a human a recommendation for evaluation and possible supplementation with additional metadata regarding or otherwise describing the recommendation 112. The recommendation 112 may be provided as feedback to the language model 106 and integrated within the model for use in predicting the degree of conformity of a subsequent block of text.

A given model may be evaluated using one or more metrics, either alone or in combination, including Accuracy, F1 score, and False Positive Rate, using a held-out test set, etc., such that once recommendations 112 surpass a threshold degree of accuracy the language model 106 is considered trained and ready for deployment for evaluation of random blocks of input text. Once deployed into production, a given model can be directly accessed by an underlying client software application or process to provide styling recommendations for text written by a user to ensure that such text conforms to the writing style or system under consideration.

The system uses language models 106 generated using machine learning ("ML") techniques to convert the one or more blocks of text into a representation that captures latent, semantic, and context-aware meaning, and uses these representations to provide guidance for individual words, phrases, and paragraphs, in a context-aware manner and relevant to the surrounding text and the article as whole. An overview of the unique qualities of the data, model structure, training data preparation, and post-processing procedures in accordance with one embodiment is outlined herein.

Models used for machine learning are trained on a large corpus of training data that is highly specific to the writing style or system under consideration. The embodiment of FIG. 1 utilizes machine learning models that rely on supervised learning techniques that utilize pre-labeled data 104. For example, training data 104 may comprise labeled strings from the corpus of training data 102 with labels extracted from the training corpus itself which may take the form of binary variables (e.g., indicating the presence of or requirement for bolding or bullets) or as categorical variables (e.g., indicating the presence of or requirement for axioms). As such, for a given item of text, $x_i$, which can be a word, a phrase, a sentence, or a paragraph, the system is operative to extract a label or class, $y_i$. According to one embodiment, labels/classes are extracted directly from a corpus of text styled in accordance with a specific writing style or system, e.g., the SMART BREVITY® writing style. The system is therefore provided with access to a set of labeled examples (e.g., $x_i$, $y_i$ pairs) subsequent to pre-processing.

Preparation of data 104 for model training may make use of a number of standard techniques that are well known to those of skill in the art for text data cleaning and pre-processing. For example, sub-routines may be implemented for removing special characters such as punctuation, symbols, etc., enforcing a minimum and maximum text length for embeddings, removal of stop words, etc. Once cleaned, specific transformations may be applied to prepare the training data 104. One such transformation comprises engineering features to track the position of an item of text within a block of text or the position of a block of text within a plurality of blocks of text; engineered features may further be resealed to fall within the same distribution as embeddings. Other exemplary transformations comprise concatenating text and document embeddings, along with any engineered features, as well as performing class balancing within a given set of training data. According to one embodiment the language model 106 is trained for six (6) epochs, during which the pretrained language model layers' learned weights are updated alongside the newly initiated classification layer weights.

Embodiments may utilize language models 106 to implement one or more disparate or conjunctive classifier models, which may comprise classifier models corresponding to one or more primary features of a given writing style or system under consideration, e.g., bolding, bulleting, axioms, etc. A given classification model may be built to estimate the probability that a piece of text belongs to a particular class, which may comprise the utilization of stochastic gradient descent to minimize an objective function. Classifier models may be built as part of a language model 106 that learns embeddings 108. The use of embeddings 108 within the language model 106 allows for the representation of text as one or more fixed length vectors that capture text meaning and semantics, although variable length vectors are considered as falling within the scope of various embodiments of the invention. According to one embodiment, the language model 106 is a RoBERTa transformer.

As indicated above, the language model 106 processes training text 102 written by an expert in a writing style or system under consideration in conjunction with one or more automatically generated engineered features 104 to produce one or more embeddings 108 that are passed to one or more classification layers within the language model 106, where one or more functions are used to return a probability for membership in each class (e.g., an 80% chance that a particular axiom should be returned). Additional heuristics 110, which may be defined by one or more editors professionally trained in specific written and unwritten conventions that are required for text to conform to the writing style or system under consideration, are employed prior to generating a recommendation 112 for output, in addition to evaluating the proposed recommendation against a probability/confidence threshold (e.g., pre-programmed logic that dictates whether a particular axiom is eligible for the first sentence of a given block of text). These probabilities and heuristics are used in forming the one or more output recommendations 112.

Further refining the processes set forth in conjunction with the description of FIG. 1, the following is a high-level recitation of an alternative program flow for model training that builds on the previously-introduced concepts:

Query a set of blocks of text data that is known to be written in accordance with a specific writing style or system to select one or more blocks of text from the set of blocks of text, e.g., a set of newsletters written in accordance with a specific writing style or system;

Split text comprising the received newsletter data into one or more blocks while removing non-text blocks;

Add a feature, which may be provided as metadata, indicating the relative position of the relative position within the data (scaled 0 to 1);

Remove blocks shorter than or exceeding a threshold number of characters, e.g., fewer than 30 characters and longer than 400 characters;

Find and replace variations of axioms used with the prototypical axiom (for example, replaces "why this matters" with "why it matters");

Map each axiom to an abbreviation and an integer label;

Label each block that employs an axiom while removing the actual axiom;

Pre-process the block text by stripping leading and trailing spaces, as well as removing artifacts from the block;

Randomly sample a class (axiom) balanced dataset as training data, with a maximum number of examples per class and, from the data, set aside a test set of random examples per class;

Shuffle the training data;

Load one or more pretrained weights for a RoBERTa model;

Tokenize each block using the RoBERTa tokenizer to return IDs for each token in the text and attention masks that shows the model where padding was added to ensure uniform input size, regardless of text length;

Begin training model training for determined number of epochs; and

During training, compute cross entropy loss for each batch and update parameters using an Adam optimizer.

Figure 2:
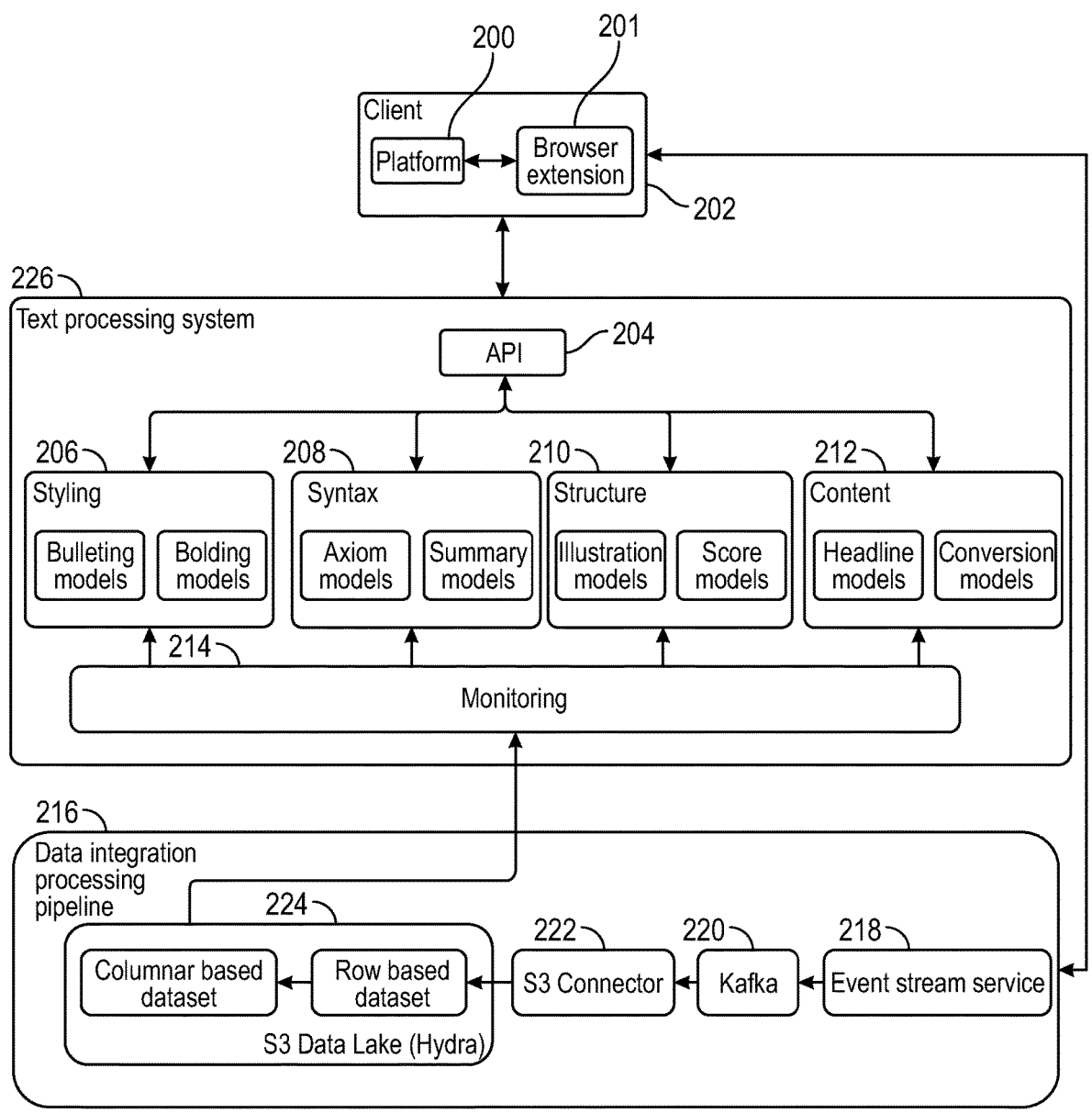
FIG. 2 presents a system diagram Illustrating a set of client-side and server-side components for processing a block of text for optimization according to one embodiment of the present invention.

Hardware and software for text optimization, which may further comprise text summarization, so as to have such text conform to a specific writing style or system under consideration may be deployed as one or more client-side and server-side hardware and software components. FIG. 2 presents a configuration of hardware and software components for processing a corpus of text for optimization in accordance with one such embodiment. Hooks to the functionality and visualization of output of the various embodiments described herein may be provided to or within a client-side software application 202, which may further comprise a software application 200 that allows the user to enter and format strings and blocks of text, e.g., a word processor. Alternatively, functionality provided by the client-side software application 200 may be deployed as a SaaS or similar web-based offering that is accessed from within the processing environment provided by a web browser (not pictured). In this instance, a browser plug-in or extension 201 may provide hooks or access to functions that provide for processing and optimization of input text in accordance with a writing style or system under consideration.

Regardless of the manner in which the user accesses the client-side software application 200, the application 200 sends a request to an API 204 residing on a remote text processing server 226 in response to text input by the user. Transmission of requests from the client application 200 to the API 204 may be made in real time in response to receipt of a threshold volume of text from the user. Alternatively, or in conjunction with the foregoing, the client application 200 may transmit requests for text processing to the API 204 on demand in response to a user request. The API 204 receives a request for text processing from a client application 202 and triages the incoming data to determine a proper component for substantive processing of the data.

As those of skill in the art recognize, the number of system components that the text processing system 226 deploys is dependent on the number of features set forth by the underlying wring style or system under consideration. In the exemplary embodiment of FIG. 2, the text processing system 226 instantiates four components to provide for further processing in accordance with specific features of the writing style under consideration. The exemplary components are described below.

A styling assistance component 206 may be provided that implements one more models for processing input text to provide the user with recommendations related to the implementation of strategic styling that organizes content for ease of reading. In accordance with the present embodiment, models are provided to process input text and provide output recommendations with regard to bulleting (strategically breaking a long section of text into smaller constituent blocks) and bolding (selective calling out of specific sections of text).

A syntax assistance component 208 provides functionality that helps the user refine word choice, sentence structure, axiom usage, and overall brevity of input text. Output of the syntax assistance component 208 provides recommendations that improve flow, cohesion, and the overall conversational nature of input text. In accordance with the present embodiment, models are provided to process input text and provide output recommendations with regard to the addition or removal of one or more axioms, as well as summarization functionality that provides output recommendations allowing the user to make the input text more concise.

A structure assistance component 210 provides functionality that helps the user refocus, reorganize, or reframe how his or her information comes together and ensures necessary structural components are present in the input text. In accordance with the present embodiment, models are provided to process input text to provide one or more illustrations in addition to return a score that is indicative of the overall adherence of the input text to the writing style or system under consideration. Other relevant models that would fall within the scope of the structure assistance component 210 are those that provide output recommendations as to what order to arrange information in the input text, e.g., ensuring that key points are properly surfaced, as well as the overall formatting of a given item of input text, which may include recommendations as to variations in visual structure of the input text so as to enhance ease of reading.

A content assistance component 212 may be provided to ensure essential information is not missing from a given item of input text in accordance with the specific writing style or system under consideration and may be further operative to generate supplemental content for the user to add to the input text that is under analysis. In accordance with the present embodiment, models are provided to process input text to recommend stylistic change to article headlines, as well as a model to operative to provide output that converts input text to a set style that the user can continue to further refine.

Continuing with the embodiment of FIG. 2, data that describes interactions that take place between the user and the text processing system 226 is routed to an interaction data processing pipeline 216 for processing prior to being made available for querying and visualization by a monitoring system 214. The entry point to the interaction data processing pipeline 216 is an event streaming service 218 that routes data as a series of data points that originate from the client system 202 as it creates data to an S3-based data lake 224 via kafka 220 and an S3 connector 222. The term "event" refers to each data point in the system and "stream" refers to the ongoing delivery of those events. Furthermore, although the present embodiment utilizes a kafka 220 and an S3 connector 222 as a mechanism to move data into an S3-based data lake 224, depending on environment specifics, various embodiments of the invention may utilize any data export mechanism that is operative to guarantee exactly-once delivery semantics to consumers of the data objects that the export mechanism creates. It should be further understood that other queuing or delivery mechanisms may be used to provide data to the interaction data processing pipeline 216.

The interaction data is prepared for querying by transforming such interaction data into a file format that is efficient for use with the specific monitoring component 214 that the text processing system 226 deploys, e.g., placing the interaction data into a schema where the monitoring component implements a RDBMS. Accordingly, this data is queried by one or more dashboards that the monitoring component provides, which may be accomplished through the use of pre-defined metrics and visualizations to assess user engagement, model performance, and drift in the trained model. As needed, monitoring dashboards inform updates to the model architecture, parameters, pre-processing steps, post-processing steps, client application UI and UX, etc. For example, the rate at which users accept assistance may indicate higher user engagement where the minimum probability threshold for certain recommendations is increased.

Figure 3:
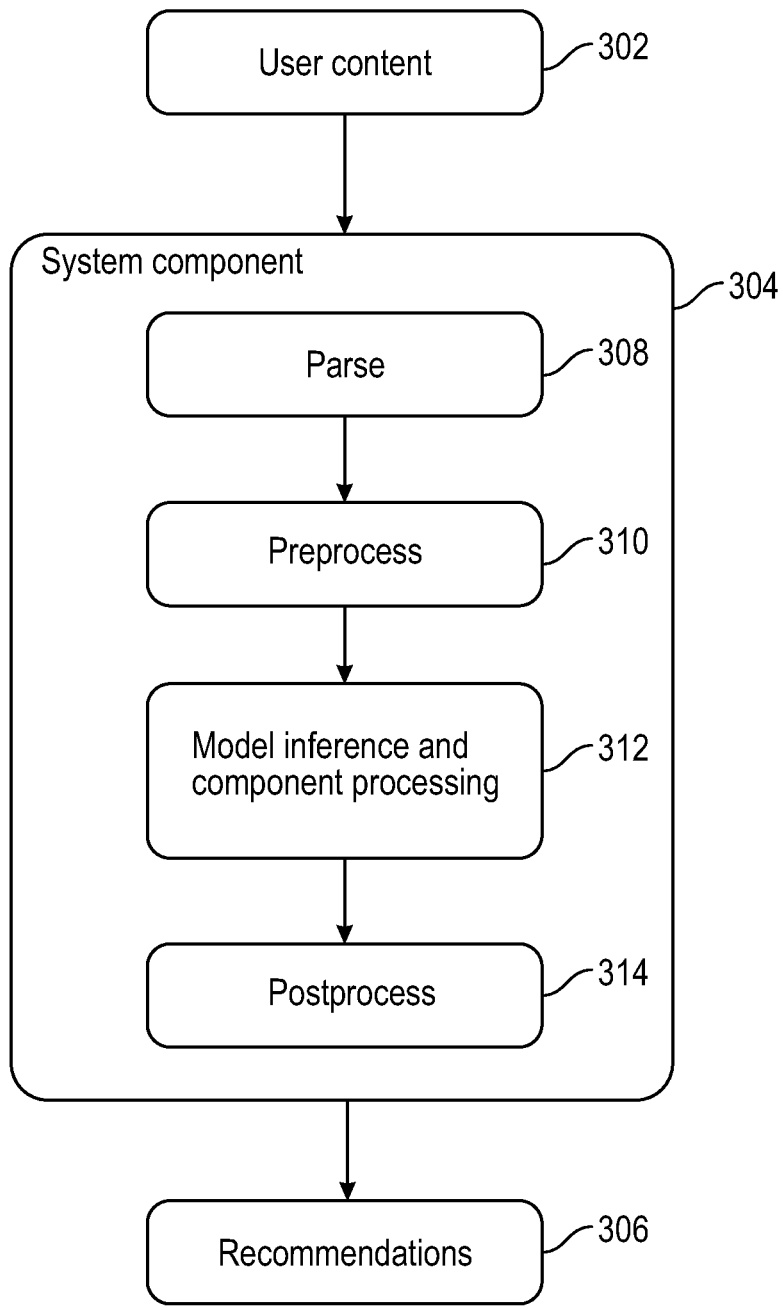
FIG. 3 presents a system diagram Illustrating a software component for processing a block of text according to one embodiment of the present invention.

Further refining the system view that FIG. 2 introduces, FIG. 3 presents a system diagram illustrating one embodiment of a software component for processing a corpus of text. A given system component that the text processing system instantiates generally conforms a template data processing pipeline for use in processing input text for optimization analysis in accordance with a writing style or system under consideration. In each instance, a system component 304 (e.g., styling, syntax, structure, content) receives input text or content 302 from a user, e.g., a web page for processing, a document that the user is drafting, etc.

A given system component 304 begins processing with a parse component 308, executed by related program code, which parses the input text or content 302 that the component 304 receives from the user into text and relevant metadata. Metadata, as used herein, again refers to any data that describes the input text in any way including, but not limited to, data such as styling, absolute position, relative position, etc. The system component 304 implements a pre-process component 310 by executing related program code that prepares the parsed input data for a model inference component 312 by related model program code. According to various embodiments, pre-processing includes, but is not limited to, feature engineering, which, for example, comprises appending a position value to input prior to inference by a given model.

Output from the model inference program code undergoes one or more post-processing steps that may, among other constraints, limit feedback that is sent to the user by ensuring adherence to a specific set of hard-coded rules and perform formatting on feedback prior to presentation to the user. Other exemplary post-processing rules may enforce length restrictions (for example, ensuring that a summarized sentence is shorter than original input sentence) or ensure that a given axiom is not recommended multiple times for a given item or block of text. The resultant, post-processed by program code associated with a post-process component 314 recommendation provided by the model inference component 312 is sent as output 306 to a requesting application as one or more recommendations to the input text so as to ensure conformity with the writing style or system under consideration.

Figure 4:
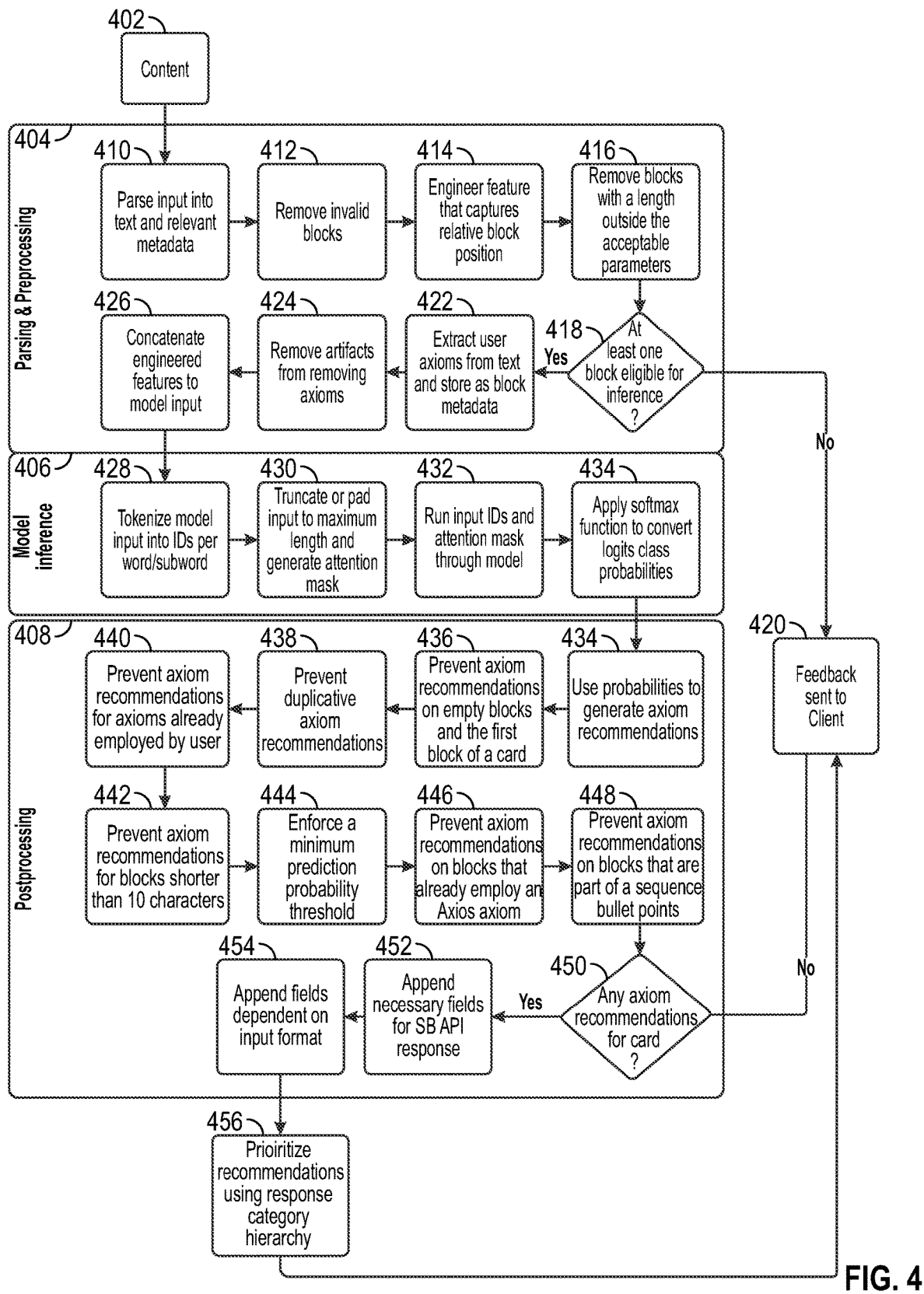
FIG. 4 presents a flow diagram illustrating a machine learning based method for processing a block of text according to one embodiment of the present invention.

As described above, the text processing system through its constituent system components may implement one or more models to provide recommendations with respect to a block of input text so as to ensure its conformity with the writing style or system under consideration. As is understood by those of skill in the art, a given system component may utilize any number of available machine learning models to generate recommendations including, but not limited to, neural-net based models and rules-based models. FIG. 4 presents a flow diagram illustrating a neural network based machine learning method for system component to process a corpus of text for the generation of one or more recommend axioms according one embodiment of the present invention.

The method of axiom processing as set forth in FIG. 4 begins with the receipt of a block of text as input, which may be any arbitrary block of text, e.g., a document that the user is writing or portion thereof a web page under consideration or portion thereof etc. Program flow that implements the model accepts the received input block of text and produces probabilities for one or more axiom classes as output. In accordance with one embodiment of the invention, model classes into which the input text may be classified include, but are not limited to, no axiom, "why it matters", "yes, but", "bottom line", "what they are saying", "go deeper", and "by the numbers". As is explained herein, however, significant pre- and post-processing of the block of input text is necessary prior to providing recommendation output.

According to one embodiment the axiom model of FIG. 4 implements a RoBERTa transformer using the PyTorch framework and pretrained weights that are fine-tuned on set of training data that is highly representative of the use of axioms by the writing style or system under consideration. The model architecture may further be expanded to include a classification head trained from scratch that is comprised of four repeating sets of layers. A given set from the four repeating sets of layers may comprise a dropout layer, a dense (or alternatively referred to as a fully-connected) layer, and a Tanh activation. In some embodiments, the last set substitutes a Softmax function instead.

Model processing is initiated upon the transmission of text content from a client application to the text processing system requesting axiom feedback 402. In some instances, the API is operative to process the incoming request to determine the axiom feedback is an appropriate response to the request. As explained above regarding system components generally, the recommendation process begins with parsing and pre-processing 404, followed by model inference 406, and post-processing 408. As such, the text processing system initiates the axiom recommendation process by parsing the incoming text block, step 410, into plain text and relevant metadata, such as paragraph type and location, in addition to other data that describes features of the block of input text. The system discards invalid content blocks that the parsing process produces, step 412, such as image blocks and empty blocks. Pre-processing program code engineers a feature to capture block position, step 414, which may be represented as a float between 0.0 and 1.0, with blocks that do not fall within the allowed block length also removed, step 416. According to one embodiment, the allowed block length is between thirty (30) and four hundred (400) characters, although other ranges may be utilized.

A check is performed to determine if there are any blocks of text eligible for model inference processing, step 418.

Where the check evaluates to false, indicating that there are not axiom recommendations available for transmission to the client application, the system component provides the responsive feedback to the client application, step 420. Where the check evaluates to true indicating that one or more blocks of text are eligible for model inference processing, program flow is directed to step 422 in which the program code extracts any axioms in the text block employed by the user, as well as stores a label in conjunction with each text block that utilizes an axiom that the model recognizes. Any artifacts produced by axiom identification, step 424, are removed including, but not limited to, trailing whitespace, leading whitespace, inconsistent capitalization, etc. Pre-processing concludes by the component program code concatenating the engineered features to the block of text under analysis so that each block text is prepended with metadata identifying the block position.

Processing continues with the parsed and pre-processed block of text being provided to a model inference subprocess 406 generating recommendations. A tokenizer uses byte-level Byte-Pair-Encoding to convert each word or sub-word into input IDs from a lookup table, step 428. According to one embodiment, the tokenizer used is that derived by the Hugging Face development team from the GPT-2 tokenizer. The tokenizer may truncate or pad input to a maximum token length, e.g., 117 tokens, and returns an attention mask to prevent model attention on the padded indices, step 430. The input IDs and attention mask are then run through the model for processing in a forward pass to calculate the logit predictions, step 432, with a Softmax function being applied to the logit predictions, step 434. This last step produces class probabilities by rescaling the logits so that the elements of the n-dimensional output lie in the range between 0.0 and 1.0.

Processing continues with the post-processing 408 the output of the model inference 406. Post-processing uses the maximum class probability per block to generate axiom predictions, step 434. The bulk of the post-processes involves the enforcement of a series of rules that are specific to the writing style or system under consideration. In the present embodiment, post-processing 408 primarily involves the application of rules to limit those portions of text for which the process returns a recommended axiom. Accordingly, program code comprising the post-processing 408 sub-process is operative to overwrite model predictions for one or more given blocks of text and return a value of "no axiom" in accordance with the following processing pipeline:

- axiom recommendations on empty blocks or the first block of text in a series or set of blocks of text, step 436, which may be further overridden in the case of specific axioms returned by model inference 406;
- duplicate axiom recommendations in instances where the same axiom has been predicted for multiple blocks, except for the block with the highest probability for that axiom, step 438;
- in instances where the predicted axiom provided by model inference 406 is already employed by the user, step 440;
- with respect to blocks of text that fall below a minimum size threshold, e.g., shorter than 10 characters, step 442;
- where the prediction probability returned by model inference 406 falls below some minimum threshold, e.g., below 0.2 probability, step 444;
- in instances where an axiom is presently utilized by a given block of text, step 446; and
- on blocks that are part of sequence of bullet points, step 448.

It should be noted by those of skill in the art that the specific post-processing steps 408 described herein in connection with axiom generation are exemplary and that relevant post-processing is dependent on the specific data output from model inference 406.

Subsequent to processing in accordance with the substantive post-processing steps, a check is performed to determine if a block of text under analysis is classified as "no axiom", meaning that the system component is not recommending the use of any axioms in or with the input text, step 450. Where the check at step 450 indicates that there is no axiom recommendation generated as a result of processing applied to the input text, program flow proceed to step 420 where the system component provides the relevant responsive feedback to the client application.

Where the check at step 450 indicates that axiom recommendations exist for the block of text that the component is analyzing, program flow is directed towards step 452 in which program code for the system component appends necessary data to the response, which may include a specific axiom and associated probability, message, user guidance, original text block, and response categories (includes response type, subtype, and detail). Additional data may be further appended to any response, step 454, e.g., so as to conform to requirements or expectations of the client application receiving any resultant recommendation(s). For example, where the client application is Prose Mirror, additional data may comprise the inclusion of information regarding the start and end location of the block of text within the Prose Mirror document. Finally, recommendations (including those from other models) are prioritized, step 456, using the response categories prior to transmission to the client application, step 420.

Figure 5:
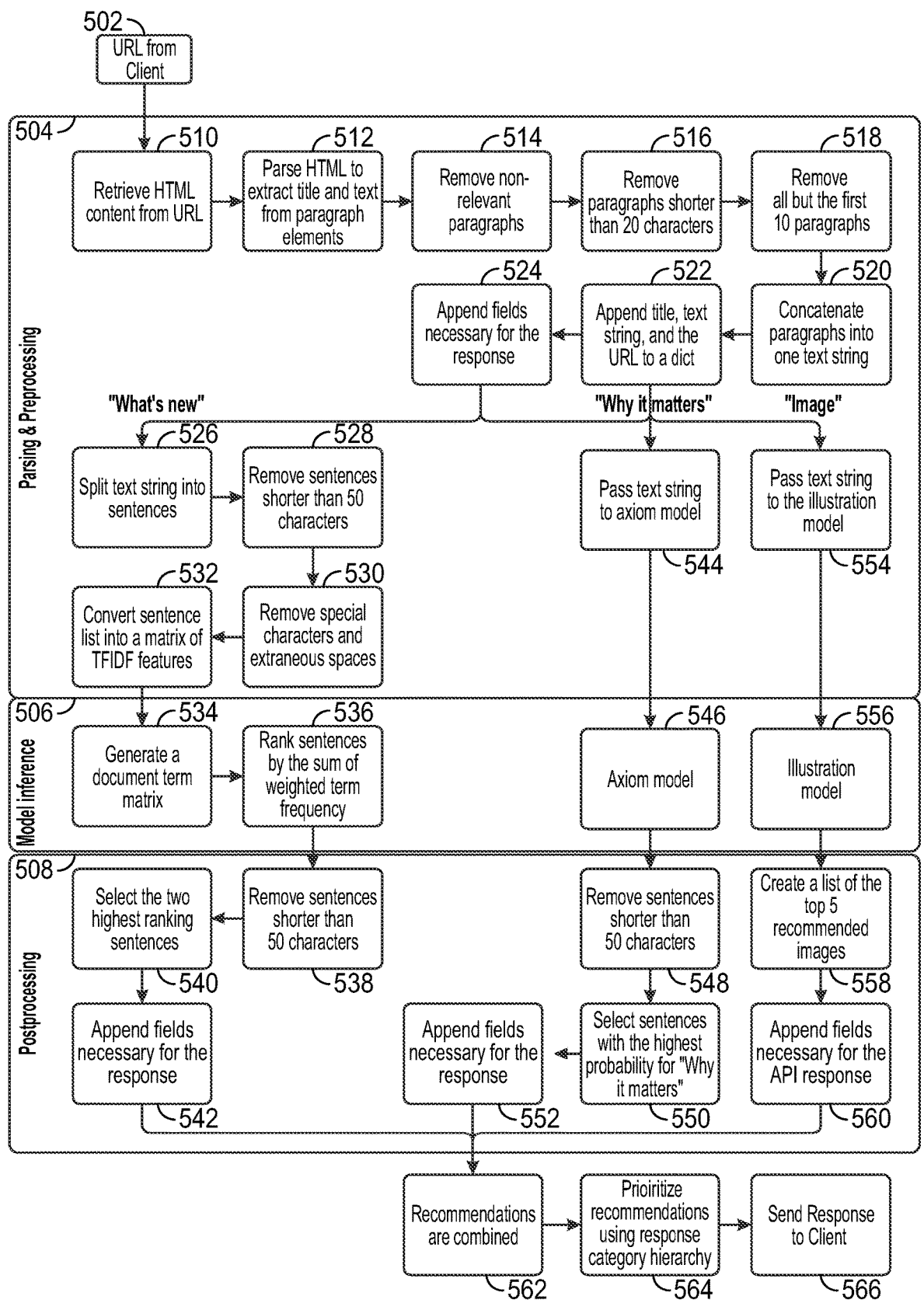
FIG. 5 presents a flow diagram illustrating an alternative machine learning based method for processing a block of text received directly from a URL in a web browser according to another embodiment of the present invention.

FIG. 5 presents a flow diagram illustrating an alternative machine learning based method for processing text according to another embodiment of the present invention. More specifically, the alternative machine learning based method of FIG. 5 utilizes model inference to convert a set of input text, e.g., one or more blocks of text, to a specific writing style or system under consideration, as opposed to providing narrowly tailored feedback as to one aspect of the input text, such as set forth in conjunction with FIG. 4.

In accordance with the exemplary conversion process of FIG. 5, a conversion system component receives a block of text, which in accordance with the present discussion is inclusive of one or more blocks of text, for conversion into a specific writing style or system under consideration. Further in accordance with the exemplary writing style under consideration, the system component implements model inference to extract a headline from the input text, identify suitable text to be identified by the axioms "what's new" and "why it matters", and finding an illustration. As with other model based system components, the program flow that the present system component implements comprises parsing and pre-processing 504, model inference 506, and post-processing 508.

In accordance with the exemplary program flow, a client application transmits a block of text, which may comprise a plurality of blocks of text, to the text processing system for processing in accordance with a conversion component. Assuming that the input text is available at publicly Icing URL, the content, which may comprise HTML content, is retrieved, step 510, and parsed, step 512, to extract title text from each paragraph comprising the input block of text. Non-relevant paragraphs, such as images or image captions, paragraphs shorter than a threshold number of characters, etc., are removed, steps 514 and 516. The resultant text is further distilled to remove all but the remaining first ten (10) paragraphs, step 518, which the system component program code concatenates into a single text string, step 520. The title, text string and URL of the source input block of text are added to a Python dict, step 522, with any additional data necessary for the API of the text processing system also appended thereto, step 524.

Parsing passes the resultant text string to several disparate processes, which may process the text string in parallel so as to achieve greater process efficiency and shorter process runtime. As indicated above, the specific writing style to which the present system component is converting the input text requires the identification of text for labeling with axioms, including but not limited to, "what's new" and "why it matters" axioms. In accordance with pre-processing to identify text for labeling with a "what's new" axiom, program flow continues by splitting the text string into a list of constituent sentences, step 526, with the removal of sentences where sentence length falls below a minimum threshold, step 528. Pre-processing in accordance with this branch of the program flow further removes special characters and extraneous whitespace, step 530, and concludes by converting the sentence list into a matrix of term frequency/inverse document frequency (TF/IDF) features, step 530. According to one embodiment, conversion of the sentence list into a matrix of TF/IDF features is accomplished through the use of the scikit-learn package, which is a Python machine learning library that features various classification, regression, and clustering algorithms.

Program flow continues with model inference 506 in which a document term matrix is generated, step 534, on the basis of the received matrix of TF/IDF features, step 532. A document-term matrix is generated using all of the terms from the text (even terms only once included), such that each row represents a sentence, each column represents a term, and each value is a TF/IDF value. The sentences are ranked in accordance with the sum their weighted term frequency, step 536, which denotes semantic importance of a given sentence.

Post-processing 508 is applied to the output of the model inference 506 sub-process, which in accordance with the present embodiment comprises the removal of sentences with a length that falls below a set threshold, which may be different from the prior threshold, step 538. Post-processing program code selects the n-highest ranked sentences for recommendation as candidates to label with the "what's new" axiom. Any necessary additional data is appended to the response in conjunction with the selected top recommendations, step 542.

In accordance with pre-processing to identify text for labeling with a "why it matters" axiom, program flow continues by calling a disparate system component for nested processing of the input block of text. In accordance with the exemplary embodiment of FIG. 5, the text string is passed to an axiom-specific system component, step 544, such as the exemplary system component Illustrated in connection with FIG. 4. Accordingly, the text string passes through parsing, pre-processing, model inference and post-processing steps in accordance with the called system component, steps 544 and 546, which it then returns to the present calling system component.

Local post-processing of the resultant data may comprise the removal of sentences with a length that falls below a set threshold, which may be different from the prior thresholds, step 548. Post-processing program code selects the n-highest ranked sentences for recommendation as candidates to label with the "why it matters" axiom, step 550. Any necessary additional data is appended to the response in conjunction with the selected top recommendations, step 552.

In accordance with pre-processing to identify text for association with one or more images, program flow continues by calling a disparate system component for nested processing of the input block of text. In accordance with the exemplary embodiment of FIG. 5, the text string is passed to an image-specific system component, step 554, which passes through parsing, pre-processing, model inference and post-processing steps in accordance with the called system component, steps 554 and 556.

As opposed to an axiom or recommendation in accordance with a writing style or system, the image-based model selects a set of images on the basis of the similarity of the text string to other texts and the images previously paired with those texts, step 556, which it then returns to the present calling system component for post-processing 506. Post-processing program code selects the n-highest ranked images for recommendation as candidates for inclusion with the input block of text, step 558. Any necessary additional data is appended to the response in conjunction with the selected top recommendations, step 560.

Disparate program flows from the three branches are directed towards step 562 in which each individual recommendation, in conjunction with any appended additional data, are combined into a single response. Program code at the system component may prioritize individual recommendations within the set of combined recommendations, step 564, which may comprise the use of a category hierarchy. The category hierarchy may prioritize each recommendation in accordance with a predefined hierarchy one the basis of response subtype and response detail, which are fields that may be found in the associated metadata. Finally, the prioritized combined recommendations are transmitted back to the client application for presentation to the user as one or more recommendations to make the input text compliant with the writing style or system under consideration, step 566.

Figure 6:
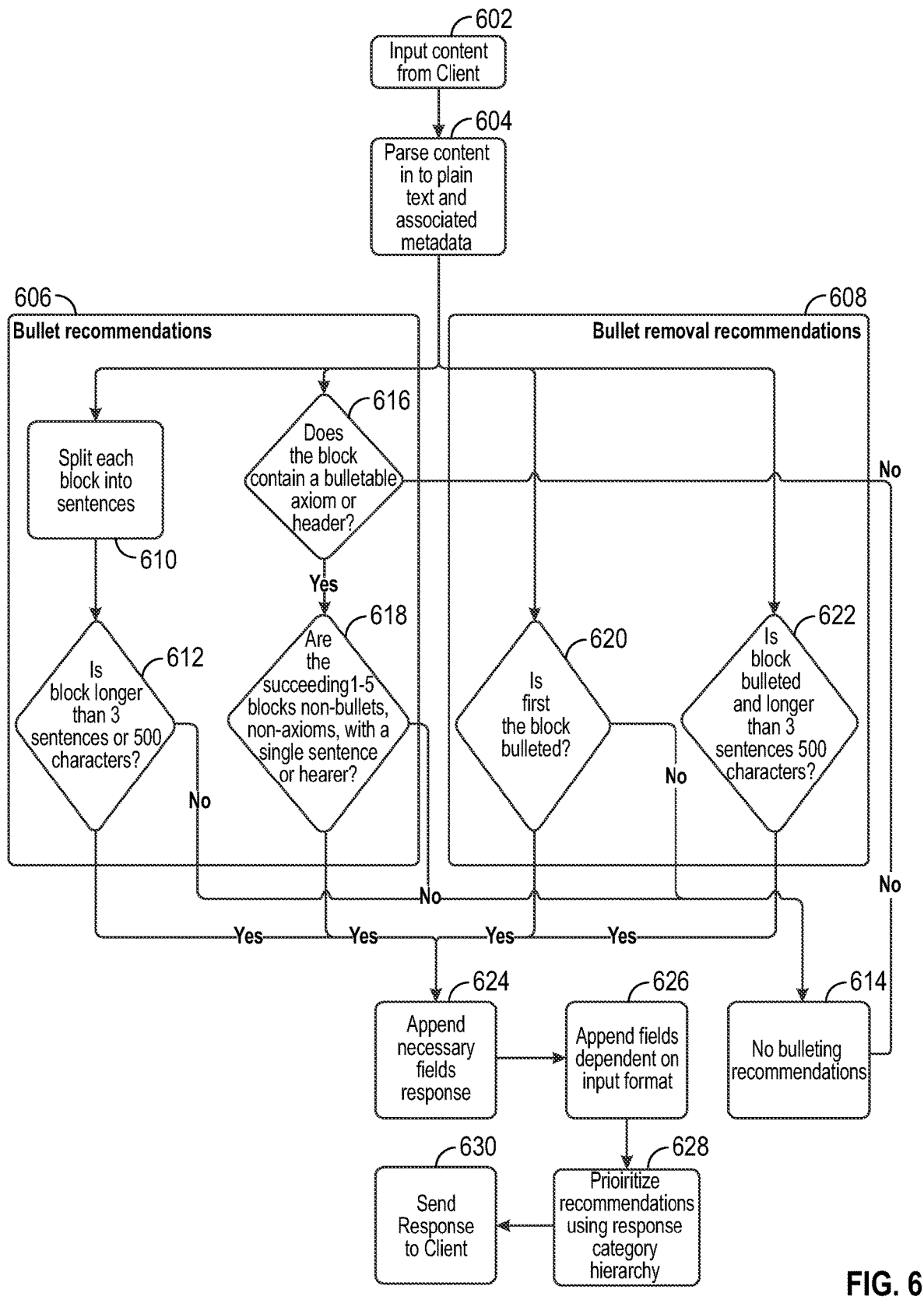
FIG. 6 presents a flow diagram illustrating a rules-based method for processing a block of text according to one embodiment of the present invention.

In addition to the above-descried model based processing of input blocks of text, embodiments of the present invention further contemplate the use of system components that implement rules-based processing. FIG. 6 presents a flow diagram illustrating one embodiment of a rules-based method for processing a corpus of text that provides recommendations with respect to the strategic bulleting of input text, e.g., breaking a block of input text into smaller units.

In accordance with the exemplary rules based model of FIG. 6, a block of input text is sent to the text processing system that the system parses into plain text and associated metadata, which may comprise, e.g., bullet points, axioms, list headers and block position, step 604. In accordance with the exemplary rules-based processing that FIG. 6 presents, program flow passes to both a bullet recommendation process 606 and a bullet removal process 608. Starting with the bullet recommendation process 606, program code splits the block of input text into its constituent sentences, step 610, and determines if the characteristics of the block of text exceed certain characteristics that warrant breaking the block of input text into a plurality of bulleted blocks of text, step 612. For example, the check at step 612 may recommend breaking up the block of input text into a plurality of bulleted blocks of text if the block comprises in excess of three sentences or 500 characters. If not, no recommendation is made with respect to buffeting, step 614.

Also occurring within the bullet recommendation process 606 is a check that is evaluating whether the block of input text comprises one or more Bulletable blocks of text, step 616. For each block of text that comprises a Bulletable block of text, step 616, a further check is performed to evaluate whether the directly succeeding steps 604, 610 and 612 comprise blocks of text that meet the following criteria:

The block of text is not a bullet;

The block of text does not contain an axiom; and

The block comprises a single sentence or header.

Those blocks of text that cause the check at step 618 to evaluate to true are recommended for bullets.

Turning to the bullet removal process 608, program code performs a first check to determine if the block of text is bulleted, step 620, and, if so, a recommendation is made to remove the bulleting. Similarly, program code comprising the bullet removal process 608 determines if the characteristics of a bulleted block of text exceed certain characteristics that warrant making a recommendation to remove the bulleting, step 622. For example, the check at step 622 may recommend the removal of bulleting if the block of bulleted text comprises in excess of three sentences and 500 characters. If not, no recommendation is made with respect to bulleting, step 614.

Any necessary additional data is appended to the response in conjunction with the selected top recommendations, step 624, including, but not limited to, block text, location, response categories (response type, subtype, and detail), which may further comprise appending additional formatting related data or data that is dependent on the format of input block of text, step 626, such as the start and end location of the block in a source document. Program code at the system component may prioritize individual recommendations within the set of recommendations, step 628, which may comprise the use of a category hierarchy. The resultant data, which may comprise prioritized data, is transmitted back to the client application as one or more recommendations with respect to the bulleting or removal of bulleting from a block of input text, step 630, which again, may comprise a plurality of blocks of input text.

Figure 7:
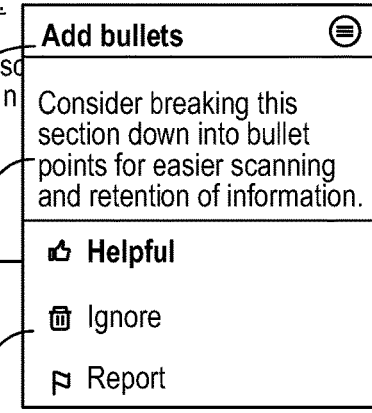
FIG. 7 presents a screen diagram illustrating a user interface for providing buffeting recommendations for a block of text according to one embodiment of the present invention.
Figure 8:
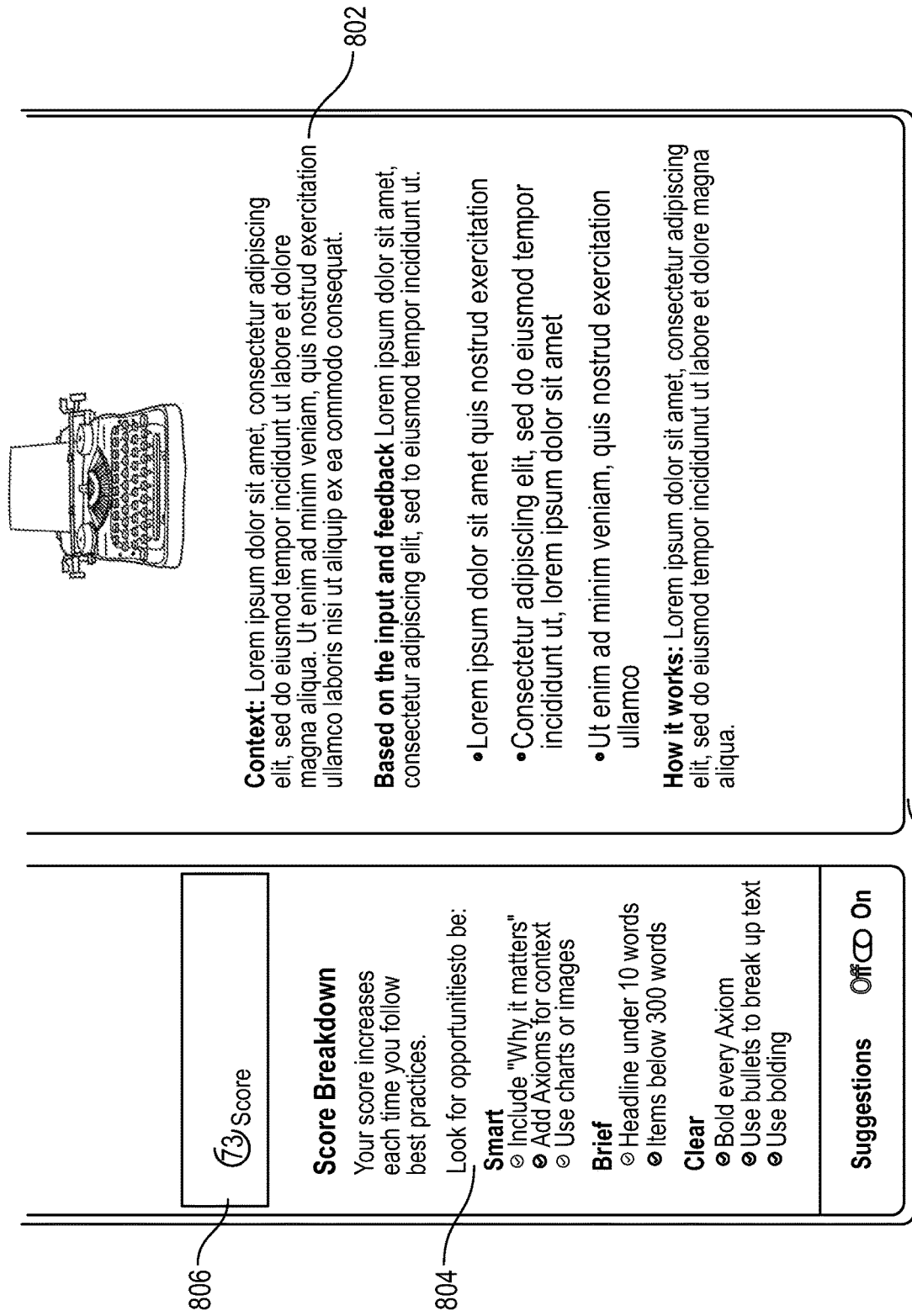
FIG. 8 presents a screen diagram illustrating user interface components for conveying feedback as to the extent of conformance of a source document to a specific writing style or system according to one embodiment of the present invention.
Figure 9:
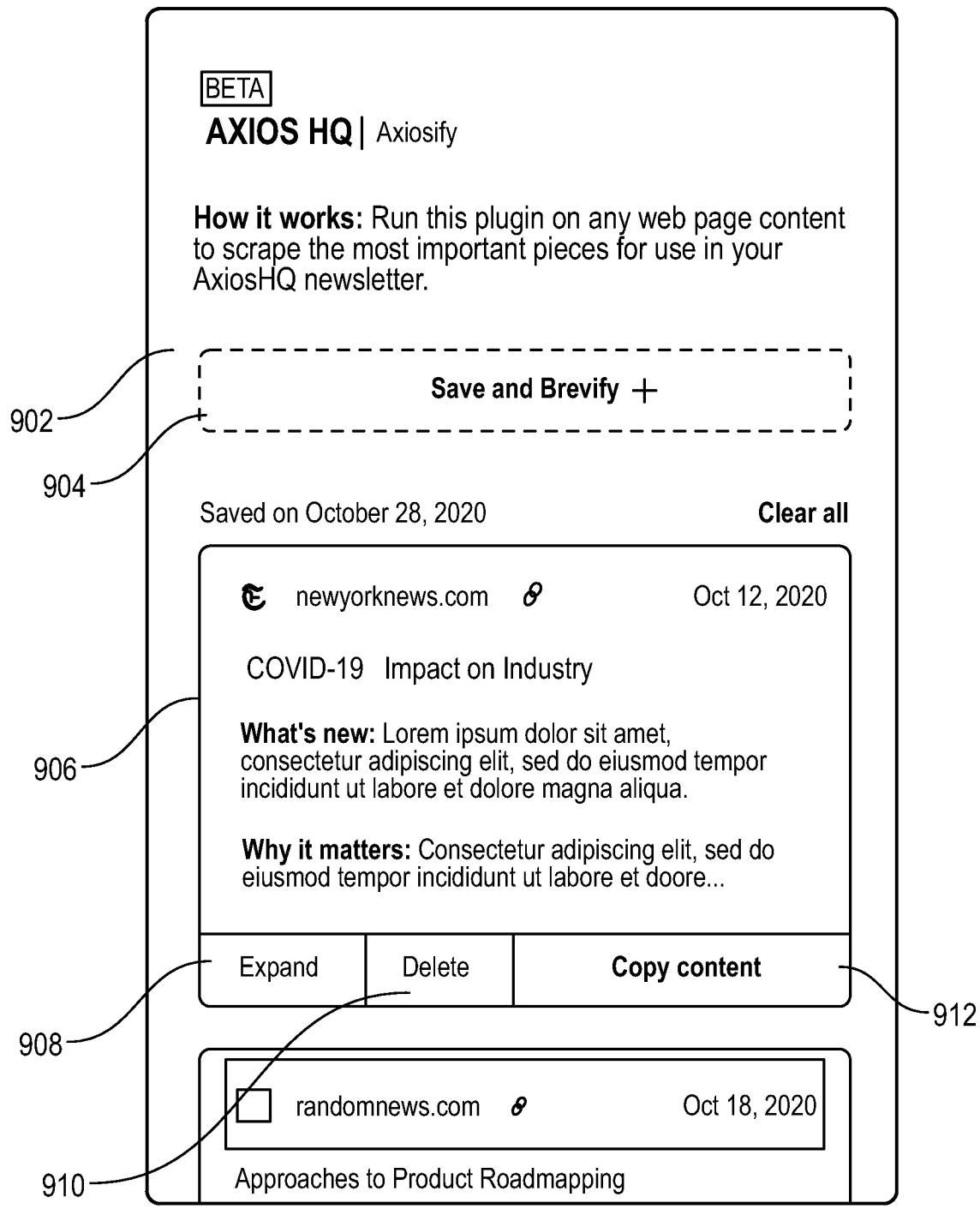
FIG. 9 presents a screen diagram illustrating controls for performing a conversion on an input HTML document from a source format to a specific writing style or system according to one embodiment of the present invention.

FIGS. 7 through 9 illustrate several exemplary user interfaces through which a user may access various aspects of embodiments of the invention described herein. FIG. 7 presents a screen diagram illustrating a user interface for providing bulleting recommendations for a block of text according to one embodiment of the present invention. The screen diagram of FIG. 7 presents UI controls that an application renders into a portion of a display screen 700. In accordance with the present embodiment, a text processing application presents a plurality of blocks of text 702, 704, and 706 that the user may write or be provide by another authored and loaded by the user into the text processing application. The user may access functionality that various embodiments of the invention described herein provide through a number of disparate UI control, which in accordance with the present embodiment the UI presents by way of a context sensitive menu 710. As known to those of skill in the art, a context sensitive menu a menu that appears in response to user action (such a mouse click) and whose contents are determined by which application window was clicked or has the input focus.

Given the selection of text and that the text processing application has the input focus, the text processing application, executes program code to pass the selected text to the text processing system, such as in accordance with the architecture presented in accordance with FIG. 2, for analysis and recommendations regarding the optimization of the input text so as to conform to a specific writing style or system. The text processing application receives recommendation information from the text processing system that the text processing application formats for rendering on the display device as a context sensitive menu 710 that identifies the type of recommendation received from the text processing system 712, specific details regarding the recommendation that the text processing system returns 714, as well as controls to provide feedback to the text processing system as to the quality of the recommendation, which the text processing system may integrate into one or more of its models, or otherwise incorporate into or utilize with future analysis.

FIG. 8 presents a screen diagram illustrating user interface components for conveying feedback as to the extent of conformance of a source document to a specific writing style or system according to one embodiment of the present invention. The screen diagram of FIG. 8 presents UI controls 804 and 806 that an application renders into a portion of a display screen 800. In accordance with the present embodiment, a text processing application presents a plurality of blocks of text 802 that the user may write or be provide by another authored and loaded by the user into the text processing application.

In accordance with the embodiment of FIG. 8, program code comprising the text processing application provides analysis regarding the text loaded by the user into the text processing application, specifically evaluating the conformity of the text 802 to a specific writing style or system under consideration in the form of an overall score 806. The text processing system may also provide the text processing application with specific details 804 that underly the overall score 806 that the text processing system is providing. Individual system components that the text processing platform implements may evaluate the input text 802 in accordance with various aspects of the writing style or system under consideration, e.g., specific aspects a given component is programmed to evaluate, and provide recommendations. In certain embodiments, the text processing system packages the one or more recommendations for transmission to and display by the text processing application. Alternatively, the text processing application may receive and integrate one or more individual data items or streams of data for display and presentation to the user.

FIG. 9 presents a screen diagram illustrating controls for performing a conversion on an input HTML document from a source format to a specific writing style or system according to one embodiment of the present invention. The screen diagram of FIG. 9 presents UI controls that an application 902 renders into a portion of a display screen. Upon selection by a user, the main UI control 904 is operative to execute program code to convert a set of input text, such as a web page or portion thereof by applying a specific writing style or system to the set of input text.

According to one embodiment, the conversion control 904 implements a machine learning based method for processing a block of text received directly from a URL in a web browser, which may be the process set forth in accordance with FIG. 5, described above, or variants thereof. The application 902 may store the output of any conversion process 904 in local or remote storage, while rendering data with respect to prior conversions 906 in conjunction with UI controls to execute program code to expand 908, delete 910, and copy 912 saved conversions. Copy functionality 912 allows for the export of converted text for further text processing or use in disparate downstream applications.

FIGS. 1 through 9 are conceptual illustrations allowing for an explanation of the present invention. Those of skill in the art should understand that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but rather should be defined only in accordance with the following claims and their equivalents.

We claim:

1. A system for optimization of text in accordance with a specific writing style, the system comprising: a client application stored in a computer readable storage medium of a computing device and that, when executed by a processor of the computing device, configures the processor to implement functionality for a user to draft and edit text; and a text processing system, wherein the text processing system is a remote cloud-based computing system, and the text processing system comprising: an application programming interface (API) configured to receive, over a communication interface, requests from the client application comprising one or more blocks of text for optimization in accordance with a specific writing style, and a plurality of system components operative to receive a given one of the one or more blocks of text from the API and return a recommendation to the client application that optimizes conformance of the given block of text in accordance with the specific writing style, the plurality of system components comprising: a plurality of models trained to analyze the given block of text and output respective recommendations that optimize conformance of the given block of text with the specific writing style and that relate to a plurality of primary features of the specific writing style including styling, syntax, and structure of text, and a post-processing component operative to apply one or more constraints to select the recommendation returned to the client application for output to the user from among the respective recommendations, an interaction data processing pipeline for processing data regarding user interaction with the client application, the interaction data representing user acceptance of the recommendation returned to the client application, and the monitoring system configured to query data from the interaction data processing pipeline and assess user interaction with the client application and performance of the plurality of models, wherein a parameter of one or more of the plurality of models is adjusted as a function of the user interaction with the client application and a performance of the one or more of the plurality of models, and wherein the client application transmits requests from the client application to the API in real time in response to receipt of a threshold volume of text from the user.

2. The system of claim 1 wherein the API routes a given one of the one or more blocks of text that it receives from the client application to the plurality of system components comprising a styling assistance component, a syntax assistance component, and a structure assistance component, wherein the styling assistance component comprises a model trained to output one or more respective recommendations specifically relating to the styling primary feature, wherein the syntax assistance component comprises a model trained to output one or more respective recommendations specifically relating to the syntax primary feature, and wherein the structure assistance component comprises a model trained to output one or more respective recommendations specifically relating to the structure primary feature.

3. The system of claim 2 wherein the interaction data processing pipeline comprises:

an event stream service to route data as a series of data points that originate from the client application as the client application creates the interaction data;
a data connector to create data objects on the basis interaction data from the event stream and provide a data export mechanism that guarantees exactly-once delivery semantics to consumers of the data objects that the data connector creates; and
a data lake to receive the data objects from the data connector for storage as a set of unstructured data.

4. The system of claim 3 wherein the monitoring system is configured to provide pre-defined metrics and visualizations to assess user engagement.

5. The system of claim 3 wherein the monitoring system is configured to provide pre-defined metrics and visualizations to assess model performance.

6. The system of claim 2 wherein each of the styling assistance component, the syntax assistance component, and the structure assistance component processes text data in accordance with a plurality of processing components.

7. The system of claim 6 wherein the plurality of processing components comprises a parse component operative to parse the given one of the one or more blocks of text into parsed text and relevant metadata.

8. The system of claim 7 wherein the plurality of processing components comprises a preprocess component operative to perform one or more transformations on the given one of the one or more blocks of text.

9. The system of claim 1 wherein one or more of the plurality of models comprises a neural network based model.

10. The system of claim 1, wherein one or more of the plurality of models comprises a rules-based model.

11. A system for optimization of text in accordance with a specific writing style, the system comprising: a client application stored in a computer readable storage medium of a computing device and that, when executed by a processor of the computing device, configures the processor to implement functionality for a user to draft and edit text; and a text processing system, wherein the text processing system is a remote cloud-based computing system, and the text processing system comprising: an application programming interface (API) configured to receive, over a communication interface, requests from the client application comprising one or more blocks of text for optimization in accordance with a specific writing style, and a plurality of system components operative to receive a given one of the one or more blocks of text from the API and return a recommendation to the client application that optimizes conformance of the given block of text in accordance with the specific writing style, the plurality of system components comprising: a plurality of models trained to analyze the given block of text and output respective recommendations that optimize conformance of the given block of text with the specific writing style and that relate to a plurality of primary features of the specific writing style including styling, syntax, and structure of text, and a post-processing component operative to apply one or more constraints to select the recommendation returned to the client application for output to the user from among the respective recommendations, an interaction data processing pipeline for processing data regarding user interaction with the client application, the interaction data representing user acceptance of the recommendation returned to the client application, and the monitoring system configured to query data from the interaction data processing pipeline and assess user interaction with the client application and performance of the plurality of models, wherein a parameter of one or more of the plurality of models is adjusted as a function of the user interaction with the client application and a performance of the one or more of the plurality of models, and wherein the one or more constraints applied by the post-processing component comprises a rule to ensure that a given recommendation is not output multiple times for the given block of text and a rule to ensure the recommendation exceeds a threshold probability of conforming with the specific writing style.

12. The system of claim 2, wherein the model of the syntax component is a neural network based model configured to identify one or more axioms, among a plurality of axioms, that correspond to the given block of text in accordance with the specific writing style, wherein the one or more respective recommendations include the identified one or more axioms.

13. A system for optimization of text in accordance with a specific writing style, the system comprising: a client application stored in a computer readable storage medium of a computing device and that, when executed by a processor of the computing device, configures the processor to implement functionality for a user to draft and edit text; and a text processing system, wherein the text processing system is a remote cloud-based computing system, and the text processing system comprising: an application programming interface (API) configured to receive, over a communication interface, requests from the client application comprising one or more blocks of text for optimization in accordance with a specific writing style, and a plurality of system components operative to receive a given one of the one or more blocks of text from the API and return a recommendation to the client application that optimizes conformance of the given block of text in accordance with the specific writing style, the plurality of system components comprising: a plurality of models trained to analyze the given block of text and output respective recommendations that optimize conformance of the given block of text with the specific writing style and that relate to a plurality of primary features of the specific writing style including styling, syntax, and structure of text, and a post-processing component operative to apply one or more constraints to select the recommendation returned to the client application for output to the user from among the respective recommendations, an interaction data processing pipeline for processing data regarding user interaction with the client application, the interaction data representing user acceptance of the recommendation returned to the client application, and the monitoring system configured to query data from the interaction data processing pipeline and assess user interaction with the client application and performance of the plurality of models, wherein a parameter of one or more of the plurality of models is adjusted as a function of the user interaction with the client application and a performance of the one or more of the plurality of models, wherein the API routes a given one of the one or more blocks of text that it receives from the client application to the plurality of system components comprising a styling assistance component, a syntax assistance component, and a structure assistance component, wherein the styling assistance component comprises a model trained to output one or more respective recommendations specifically relating to the styling primary feature, wherein the syntax assistance component comprises a model trained to output one or more respective recommendations specifically relating to the syntax primary feature, and wherein the structure assistance component comprises a model trained to output one or more respective recommendations specifically relating to the structure primary feature, wherein the model of the syntax component is a neural network based model configured to identify one or more axioms, among a plurality of axioms, that correspond to the given block of text in accordance with the specific writing style, wherein the one or more respective recommendations include the identified one or more axioms, and wherein a classification layer of the neural network based model is configured to calculate a respective probability that the given block of text is a member of a respective class associated with the one or more axioms, and wherein the neural network model outputs the one or more respective recommendations including the identified one or more axioms as a function of the respective probabilities exceeding a threshold probability.

14. A system for optimization of text in accordance with a specific writing style, the system comprising: a client application stored in a computer readable storage medium of a computing device and that, when executed by a processor of the computing device, configures the processor to implement functionality for a user to draft and edit text; and a text processing system, wherein the text processing system is a remote cloud-based computing system, and the text processing system comprising: an application programming interface (API) configured to receive, over a communication interface, requests from the client application comprising one or more blocks of text for optimization in accordance with a specific writing style, and a plurality of system components operative to receive a given one of the one or more blocks of text from the API and return a recommendation to the client application that optimizes conformance of the given block of text in accordance with the specific writing style, the plurality of system components comprising: a plurality of models trained to analyze the given block of text and output respective recommendations that optimize conformance of the given block of text with the specific writing style and that relate to a plurality of primary features of the specific writing style including styling, syntax, and structure of text, and a post-processing component operative to apply one or more constraints to select the recommendation returned to the client application for output to the user from among the respective recommendations, an interaction data processing pipeline for processing data regarding user interaction with the client application, the interaction data representing user acceptance of the recommendation returned to the client application, and the monitoring system configured to query data from the interaction data processing pipeline and assess user interaction with the client application and performance of the plurality of models, wherein a parameter of one or more of the plurality of models is adjusted as a function of the user interaction with the client application and a performance of the one or more of the plurality of models, wherein the API routes a given one of the one or more blocks of text that it receives from the client application to the plurality of system components comprising a styling assistance component, a syntax assistance component, and a structure assistance component, wherein the styling assistance component comprises a model trained to output one or more respective recommendations specifically relating to the styling primary feature, wherein the syntax assistance component comprises a model trained to output one or more respective recommendations specifically relating to the syntax primary feature, and wherein the structure assistance component comprises a model trained to output one or more respective recommendations specifically relating to the structure primary feature, wherein the model of the syntax component is a neural network based model configured to identify one or more axioms, among a plurality of axioms, that correspond to the given block of text in accordance with the specific writing style, wherein the one or more respective recommendations include the identified one or more axioms, and wherein the model of the styling assistance component is configured to generate the one or more respective recommendations for bolding or bulleting the given block of text in accordance with the specific writing style.

15. The system of claim 1, wherein the plurality of models comprises: a model configured to evaluate an overall conformity of the one or more blocks of text to the specific writing style and output a score representing the overall conformity, wherein the text processing system is configured to provide the score to the client application for output to the user along with the recommendation.

16. The system of claim 1, wherein the plurality of models are configured to output the respective recommendations as a function of a respective probability that the given block of text conforms to a specific rule of the specific writing style and a probability threshold.

17. The system of claim 1, A system for optimization of text in accordance with a specific writing style, the system comprising: a client application stored in a computer readable storage medium of a computing device and that, when executed by a processor of the computing device, configures the processor to implement functionality for a user to draft and edit text; and a text processing system, wherein the text processing system is a remote cloud-based computing system, and the text processing system comprising: an application programming interface (API) configured to receive, over a communication interface, requests from the client application comprising one or more blocks of text for optimization in accordance with a specific writing style, and a plurality of system components operative to receive a given one of the one or more blocks of text from the API and return a recommendation to the client application that optimizes conformance of the given block of text in accordance with the specific writing style, the plurality of system components comprising: a plurality of models trained to analyze the given block of text and output respective recommendations that optimize conformance of the given block of text with the specific writing style and that relate to a plurality of primary features of the specific writing style including styling, syntax, and structure of text, and a post-processing component operative to apply one or more constraints to select the recommendation returned to the client application for output to the user from among the respective recommendations, an interaction data processing pipeline for processing data regarding user interaction with the client application, the interaction data representing user acceptance of the recommendation returned to the client application, and the monitoring system configured to query data from the interaction data processing pipeline and assess user interaction with the client application and performance of the plurality of models, wherein a parameter of one or more of the plurality of models is adjusted as a function of the user interaction with the client application and a performance of the one or more of the plurality of models, wherein the parameter of the model inference component that is adjusted is the probability threshold, and wherein the probability threshold is adjusted as a function of a rate at which the user accepts recommendations output by the text processing system via the client application.

* * * * *

UNITED STATES PATENT AND TRADEMARK OFFICE
CERTIFICATE OF CORRECTION

| | |
|---|---|
| PATENT NO. | : 11,755,636 B2 |
| APPLICATION NO. | : 17/169774 |
| DATED | : September 12, 2023 |
| INVENTOR(S) | : Priyanka Oberoi et al. |

It is certified that error appears in the above-identified patent and that said Letters Patent is hereby corrected as shown below:

In the Claims

Column 18, Lines 11-67 through Column 22, Lines 1-64, Claims 1-17, replace claims with the following:

1. A system for optimization of text in accordance with a specific writing style, the system comprising:
    a client application stored in a computer readable storage medium of a computing device and that, when executed by a processor of the computing device, configures the processor to implement functionality for a user to draft and edit text; and
    a text processing system, wherein the text processing system is a remote cloud-based computing system, and the text processing system comprising:
        an application programming interface (API) configured to receive, over a communication interface, requests from the client application comprising one or more blocks of text for optimization in accordance with a specific writing style, and
        a plurality of system components operative to receive a given one of the one or more blocks of text from the API and return a recommendation to the client application that optimizes conformance of the given block of text in accordance with the specific writing style,
        the plurality of system components comprising:
            a plurality of models trained to analyze the given block of text and output respective recommendations that optimize conformance of the given block of text with the specific writing style and that relate to a plurality of primary features of the specific writing style including styling, syntax, and structure of text, and
            a post-processing component operative to apply one or more constraints to select the recommendation returned to the client application for output to the user from among the respective recommendations,
        an interaction data processing pipeline for processing data regarding user interaction with the client application, the interaction data representing user acceptance of the recommendation returned to the client application, and Signed and Sealed this
Twentieth Day of August, 2024

*Katherine Kelly Vidal*

Katherine Kelly Vidal
*Director of the United States Patent and Trademark Office* the monitoring system configured to query data from the interaction data processing pipeline and assess user interaction with the client application and performance of the plurality of models, wherein a parameter of one or more of the plurality of models is adjusted as a function of the user interaction with the client application and a performance of the one or more of the plurality of models, and wherein the client application transmits requests from the client application to the API in real time in response to receipt of a threshold volume of text from the user.

2. The system of claim 1 wherein the API routes a given one of the one or more blocks of text that it receives from the client application to the plurality of system components comprising a styling assistance component, a syntax assistance component, and a structure assistance component, wherein the styling assistance component comprises a model trained to output one or more respective recommendations specifically relating to the styling primary feature, wherein the syntax assistance component comprises a model trained to output one or more respective recommendations specifically relating to the syntax primary feature, and wherein the structure assistance component comprises a model trained to output one or more respective recommendations specifically relating to the structure primary feature.

3. The system of claim 2 wherein the interaction data processing pipeline comprises:
    an event stream service to route data as a series of data points that originate from the client application as the client application creates the interaction data;
    a data connector to create data objects on the basis interaction data from the event stream and provide a data export mechanism that guarantees exactly-once delivery semantics to consumers of the data objects that the data connector creates; and
    a data lake to receive the data objects from the data connector for storage as a set of unstructured data.

4. The system of claim 3 wherein the monitoring system is configured to provide pre-defined metrics and visualizations to assess user engagement.

5. The system of claim 3 wherein the monitoring system is configured to provide pre-defined metrics and visualizations to assess model performance.

6. The system of claim 2 wherein each of the styling assistance component, the syntax assistance component, and the structure assistance component processes text data in accordance with a plurality of processing components.

7. The system of claim 6 wherein the plurality of processing components comprises a parse component operative to parse the given one of the one or more blocks of text into parsed text and relevant metadata.

8. The system of claim 7 wherein the plurality of processing components comprises a preprocess component operative to perform one or more transformations on the given one of the one or more blocks of text.

9. The system of claim 1 wherein one or more of the plurality of models comprises a neural network based model.

10. The system of claim 1, wherein one or more of the plurality of models comprises a rules-based model.

11. A system for optimization of text in accordance with a specific writing style, the system comprising:
 a client application stored in a computer readable storage medium of a computing device and that, when executed by a processor of the computing device, configures the processor to implement functionality for a user to draft and edit text; and
 a text processing system, wherein the text processing system is a remote cloud-based computing system, and the text processing system comprising:
  an application programming interface (API) configured to receive, over a communication interface, requests from the client application comprising one or more blocks of text for optimization in accordance with a specific writing style, and
  a plurality of system components operative to receive a given one of the one or more blocks of text from the API and return a recommendation to the client application that optimizes conformance of the given block of text in accordance with the specific writing style,
   the plurality of system components comprising:
    a plurality of models trained to analyze the given block of text and output respective recommendations that optimize conformance of the given block of text with the specific writing style and that relate to a plurality of primary features of the specific writing style including styling, syntax, and structure of text, and
    a post-processing component operative to apply one or more constraints to select the recommendation returned to the client application for output to the user from among the respective recommendations,
   an interaction data processing pipeline for processing data regarding user interaction with the client application, the interaction data representing user acceptance of the recommendation returned to the client application, and
    the monitoring system configured to query data from the interaction data processing pipeline and assess user interaction with the client application and performance of the plurality of models, wherein a parameter of one or more of the plurality of models is adjusted as a function of the user interaction with the client application and a performance of the one or more of the plurality of models, and wherein the one or more constraints applied by the post-processing component comprises a rule to ensure that a given recommendation is not output multiple times for the given block of text and a rule to ensure the recommendation exceeds a threshold probability of conforming with the specific writing style.

12. The system of claim 2, wherein the model of the syntax component is a neural network based model configured to identify one or more axioms, among a plurality of axioms, that correspond to the given block of text in accordance with the specific writing style, wherein the one or more respective recommendations include the identified one or more axioms.

13. A system for optimization of text in accordance with a specific writing style, the system comprising:

a client application stored in a computer readable storage medium of a computing device and that, when executed by a processor of the computing device, configures the processor to implement functionality for a user to draft and edit text; and a text processing system, wherein the text processing system is a remote cloud-based computing system, and the text processing system comprising:

an application programming interface (API) configured to receive, over a communication interface, requests from the client application comprising one or more blocks of text for optimization in accordance with a specific writing style, and a plurality of system components operative to receive a given one of the one or more blocks of text from the API and return a recommendation to the client application that optimizes conformance of the given block of text in accordance with the specific writing style, the plurality of system components comprising:

a plurality of models trained to analyze the given block of text and output respective recommendations that optimize conformance of the given block of text with the specific writing style and that relate to a plurality of primary features of the specific writing style including styling, syntax, and structure of text, and a post-processing component operative to apply one or more constraints to select the recommendation returned to the client application for output to the user from among the respective recommendations, an interaction data processing pipeline for processing data regarding user interaction with the client application, the interaction data representing user acceptance of the recommendation returned to the client application, and the monitoring system configured to query data from the interaction data processing pipeline and assess user interaction with the client application and performance of the plurality of models, wherein a parameter of one or more of the plurality of models is adjusted as a function of the user interaction with the client application and a performance of the one or more of the plurality of models, wherein the API routes a given one of the one or more blocks of text that it receives from the client application to the plurality of system components comprising a styling assistance component, a syntax assistance component, and a structure assistance component, wherein the styling assistance component comprises a model trained to output one or more respective recommendations specifically relating to the styling primary feature, wherein the syntax assistance component comprises a model trained to output one or more respective recommendations specifically relating to the syntax primary feature, and wherein the structure assistance component comprises a model trained to output one or more respective recommendations specifically relating to the structure primary feature, wherein the model of the syntax component is a neural network based model configured to identify one or more axioms, among a plurality of axioms, that correspond to the given block of text in accordance with the specific writing style, wherein the one or more respective recommendations include the identified one or more axioms, and wherein a classification layer of the neural network based model is configured to calculate a respective probability that the given block of text is a member of a respective class associated with the one or more axioms, and wherein the neural network model outputs the one or more respective recommendations including the identified one or more axioms as a function of the respective probabilities exceeding a threshold probability.

14. A system for optimization of text in accordance with a specific writing style, the system comprising:

a client application stored in a computer readable storage medium of a computing device and that, when executed by a processor of the computing device, configures the processor to implement functionality for a user to draft and edit text; and a text processing system, wherein the text processing system is a remote cloud-based computing system, and the text processing system comprising:

an application programming interface (API) configured to receive, over a communication interface, requests from the client application comprising one or more blocks of text for optimization in accordance with a specific writing style, and a plurality of system components operative to receive a given one of the one or more blocks of text from the API and return a recommendation to the client application that optimizes conformance of the given block of text in accordance with the specific writing style, the plurality of system components comprising:

a plurality of models trained to analyze the given block of text and output respective recommendations that optimize conformance of the given block of text with the specific writing style and that relate to a plurality of primary features of the specific writing style including styling, syntax, and structure of text, and a post-processing component operative to apply one or more constraints to select the recommendation returned to the client application for output to the user from among the respective recommendations, an interaction data processing pipeline for processing data regarding user interaction with the client application, the interaction data representing user acceptance of the recommendation returned to the client application, and the monitoring system configured to query data from the interaction data processing pipeline and assess user interaction with the client application and performance of the plurality of models, wherein a parameter of one or more of the plurality of models is adjusted as a function of the user interaction with the client application and a performance of the one or more of the plurality of models, wherein the API routes a given one of the one or more blocks of text that it receives from the client application to the plurality of system components comprising a styling assistance component, a syntax assistance component, and a structure assistance component, wherein the styling assistance component comprises a model trained to output one or more respective recommendations specifically relating to the styling primary feature, wherein the syntax assistance component comprises a model trained to output one or more respective recommendations specifically relating to the syntax primary feature, and wherein the structure assistance component comprises a model trained to output one or more respective recommendations specifically relating to the structure primary feature, wherein the model of the syntax component is a neural network based model configured to identify one or more axioms, among a plurality of axioms, that correspond to the given block of text in accordance with the specific writing style, wherein the one or more respective recommendations include the identified one or more axioms, and wherein the model of the styling assistance component is configured to generate the one or more respective recommendations for bolding or bulleting the given block of text in accordance with the specific writing style.

15. The system of claim 1, wherein the plurality of models comprises:
a model configured to evaluate an overall conformity of the one or more blocks of text to the specific writing style and output a score representing the overall conformity, wherein the text processing system is configured to provide the score to the client application for output to the user along with the recommendation.

16. The system of claim 1, wherein the plurality of models are configured to output the respective recommendations as a function of a respective probability that the given block of text conforms to a specific rule of the specific writing style and a probability threshold.

17. A system for optimization of text in accordance with a specific writing style, the system comprising:
a client application stored in a computer readable storage medium of a computing device and that, when executed by a processor of the computing device, configures the processor to implement functionality for a user to draft and edit text; and
a text processing system, wherein the text processing system is a remote cloud-based computing system, and the text processing system comprising:
an application programming interface (API) configured to receive, over a communication interface, requests from the client application comprising one or more blocks of text for optimization in accordance with a specific writing style, and
a plurality of system components operative to receive a given one of the one or more blocks of text from the API and return a recommendation to the client application that optimizes conformance of the given block of text in accordance with the specific writing style,
the plurality of system components comprising:
a plurality of models trained to analyze the given block of text and output respective recommendations that optimize conformance of the given block of text with the specific writing style and that relate to a plurality of primary features of the specific writing style including styling, syntax, and structure of text, and
a post-processing component operative to apply one or more constraints to select the recommendation returned to the client application for output to the user from among the respective recommendations,
an interaction data processing pipeline for processing data regarding user interaction with the client application, the interaction data representing user acceptance of the recommendation returned to the client application, and
the monitoring system configured to query data from the interaction data processing pipeline and assess user interaction with the client application and performance of the plurality of models, wherein a parameter of one or more of the plurality of models is adjusted as a function of the user interaction with the client application and a performance of the one or more of the plurality of models, wherein the parameter of the model inference component that is adjusted is the probability threshold, and wherein the probability threshold is adjusted as a function of a rate at which the user accepts recommendations output by the text processing system via the client application.